(12) United States Patent
Moriarty

(10) Patent No.: US 6,811,480 B2
(45) Date of Patent: Nov. 2, 2004

(54) TELESCOPIC POULTRY SHACKLE

(75) Inventor: Larry Moriarty, Atlanta, GA (US)

(73) Assignee: Dapec, Inc., Canton, GA (US)

( * ) Notice: Subject to any disclaimer, the term of this patent is extended or adjusted under 35 U.S.C. 154(b) by 0 days.

(21) Appl. No.: 09/758,738

(22) Filed: Jan. 10, 2001

(65) Prior Publication Data

US 2002/0090905 A1 Jul. 11, 2002

(51) Int. Cl.$^7$ ............................................... A22C 21/00
(52) U.S. Cl. ........................ 452/188; 452/179; 452/187
(58) Field of Search ..................... 452/188, 187, 452/191, 177, 178, 179, 167, 183, 190; 198/680; 209/592

(56) References Cited

U.S. PATENT DOCUMENTS

| | | | |
|---|---|---|---|
| 1,636,872 A | | 7/1927 | Seidel et al. |
| 2,456,224 A | | 12/1948 | Sullivan |
| 2,557,707 A | | 6/1951 | Utter |
| 2,614,287 A | | 10/1952 | Crane |
| 2,739,347 A | * | 3/1956 | Sharp et al. ................. 452/183 |
| 3,263,270 A | * | 8/1966 | Crawford et al. ............ 452/183 |
| 3,581,339 A | * | 6/1971 | Smith .......................... 452/183 |
| 3,717,240 A | * | 2/1973 | Ekstam .................. 198/377.02 |
| 3,781,946 A | * | 1/1974 | Altenpohl .................... 452/183 |
| 4,163,488 A | | 8/1979 | Brook |
| 4,317,258 A | * | 3/1982 | Altenpohl et al. ........... 452/183 |
| 4,488,635 A | | 12/1984 | Linville |
| 4,577,708 A | | 3/1986 | Brook |
| 4,896,399 A | | 1/1990 | Hazenbroek |
| 5,037,351 A | * | 8/1991 | Van Den Nieuwelaar et al. ................................................ 452/179 |
| 5,092,815 A | | 3/1992 | Polkinghorne |
| 5,366,406 A | | 11/1994 | Hobbel et al. |
| 5,487,700 A | | 1/1996 | Dillard |
| 5,505,657 A | * | 4/1996 | Janssen et al. .............. 452/179 |
| 5,875,738 A | | 3/1999 | Hazenbroek et al. |
| 6,017,269 A | | 1/2000 | Altenpohl, III |
| 6,179,701 B1 | * | 1/2001 | Tieleman .................... 452/179 |
| 6,179,702 B1 | * | 1/2001 | Hazenbroek ................ 452/188 |

FOREIGN PATENT DOCUMENTS

EP 0086700 * 8/1983

* cited by examiner

*Primary Examiner*—Peter M. Poon
*Assistant Examiner*—David Parsley
(74) *Attorney, Agent, or Firm*—Thomas, Kayden, Horstemeyer & Risley

(57) ABSTRACT

A shackle assembly for transporting a poultry carcass suspended by its legs along a processing path and over a weighing scale for weighing the carcass. The shackle assembly includes a trolley support, a trolley mounted to the trolley support for engaging the weighing scale, and a bird carrier for suspending a poultry carcass by its legs. A telescopic connector system joins the trolley support to the bird carrier and suspends the bird carrier from the trolley support. A cam-actuated turning system is mounted to the trolley support and operatively connected to the bird carrier for rotating the trolley support and the bird carrier in unison.

23 Claims, 5 Drawing Sheets

TELESCOPIC POULTRY SHACKLE

FIELD OF THE INVENTION

This invention generally relates to shackles for suspending poultry carcasses from a conveyor line of a poultry processing plant. More particularly, the invention involves shackle assemblies for transporting poultry carcasses in series, suspended by their legs, over a track of a weighing scale for weighing the suspended carcass and then along a cut up line for separating the parts of the carcasses, or otherwise treating the carcasses in response to the detected weight of the bird.

BACKGROUND OF THE INVENTION

In modern poultry processing facilities, birds, such as chickens, are suspended from shackles on conveyor lines where they are transported sequentially through numerous processing operations. Each shackle includes a pair of stirrups for supporting the feet or legs of the birds and for maintaining the birds in an inverted position. The upper portions of the shackles are supported on a conveyor track and are transported through the processing area by a conveyor chain.

Typically, the birds are suspended by their feet from shackles on a first conveyor line for killing, decapitation, defeathering and feet removal. After the birds have been processed through the kill line, defeathered, and had their feet removed, the carcasses are then rehung by their legs from shackles on another processing line where they are passed in sequence through an evisceration room for removal of the giblets. The birds are next dropped from the evisceration line into a chiller where the temperature of the birds is reduced. The chilled birds are then rehung for conveying through subsequent processing stations, such as a weight scale for determining the weights of the birds and separating the birds according to their weights, and/or through a cut up line where the carcasses are cut into parts.

Some of these conventional poultry processing plants include a weight scale that is placed upstream of the cut up line for weighing the shackled carcasses and assigning different cut up functions for each carcass depending upon its weight. In this configuration, a computer receives the weight information for each shackle from the weight scale. Then, as the weighed shackle approaches a subsequent treatment station, such as a cut up module, the carcass can either enter or bypass the cut up module by using a diverter to deflect the carcass away from the cut up module in order to avoid cutting the carcass.

The shackles that carry the birds through the weighing and cutting line are typically pivotal about a vertical axis for rotating the carcasses to the appropriate angles necessary for the cut up equipment to receive and cut the various parts from the carcasses. Turning shackles suitable for use on a cut up line are disclosed in U.S. Pat. Nos. 5,092,815 and 5,487,700, and in U.S. patent application Ser. No. 09/181, 099 which are all hereby incorporated by reference into this document. U.S. Pat. No. 5,366,406 is also incorporated by reference and discloses a angularly displaceable grading shackle with wheels that engage a weighing scale as the shackles are weighed.

Shackles that are currently used for the weighing and cutting lines require the entire shackle and bird to be weighed simultaneously. This is accomplished by moving the conveyor line 180 degrees about a carousel that tilts both the shackle and bird in order to detect the weight of the bird. The weight calculated from such conventional technology is not very accurate because the whole shackle is being weighed instead of just the bird. The requirement for a 180-degree turn about a carousel also requires additional space in the line and is expensive to configure.

Therefore, it would be desirable to provide a shackle for transporting poultry carcasses continuously through a weight scale and along a cut up line that does not require the whole shackle to be lifted during the weighing function and that does not require movement of the shackles and the birds about a carousel. Instead, it would be desirable for the shackle to move straight through the weight scale and include moveable sections that require only a portion of the shackle to be weighed with the bird.

BRIEF SUMMARY OF THE INVENTION

It is therefore an object of this invention to address these and other shortcomings of conventional technology by providing, in various forms, a shackle assembly for transporting a poultry carcass suspended by its legs along a processing path and over a weighing scale track for weighing the carcass. The shackle assembly includes a trolley support, a trolley mounted to the trolley support for engaging the weighing scale track, and a bird carrier for suspending the poultry carcass by its legs. A cam-actuated turning means is mounted to the trolley support and operatively connected to the bird carrier for rotating the trolley support and the bird carrier in unison about a vertical axis. Telescopic connector means telescopically connects the trolley support to the bird carrier and suspends the bird carrier from the trolley support.

The telescopic connector means further includes the trolley support and the bird carrier having overlapping ends with aligned openings extending therethrough, and the trolley having a wheel axle extending through these aligned openings. The overlapping ends of the trolley support and bird carrier are adapted to move axially with respect to each other in response to the trolley passing over the weighing scale. For example, one of the aligned openings may be an axial-aligned slot.

The telescopic connector means includes one of the trolley support and the bird carrier having a tubular support defining a central passage and the other of the trolley support and the bird carrier having a rod extending into the central passage of the tubular support. For example, the trolley support will have a tubular support defining a central passage, and the bird carrier will have a rod extending upwardly into the central passage of the tubular support. The tubular support and the rod define aligned openings wherein the trolley includes a wheel axle extending through the aligned openings for connecting the tubular support and the rod in a substantially non-rotating relationship. At least one of the aligned openings is preferably of larger vertical breadth than a cross-sectional breadth of the wheel axle for permitting vertical telescopic movement between the tubular support and the rod in a substantially non-rotating relationship. Also, the aligned openings of both the tubular support and the rod are of sufficient breadth to permit the wheel axle to tilt when one of the wheels is elevated higher than the other wheel.

The invention also generally relates to a method of processing poultry carcasses as the carcasses move along a poultry processing path and for weighing the carcasses on a weighing scale as the carcasses are moved along the processing path. The method includes the steps of suspending the carcasses from a shackle having a trolley support with a trolley attached thereto, and a bird carrier connected to the trolley support. While the carcasses are suspended, the trolley is passed over the weighing scale, and in response to passing the trolley over the weighing scale, the bird carrier is lifted with respect to the trolley support by the scale. The method also includes weighing the carcass as the carcass passes over the scale, turning the carcasses about a vertical axis, and cutting the carcass into segments.

The step of turning the carcasses about a vertical axis may further include moving the trolley support along the processing path, and engaging a cam follower mounted on the trolley support with a corresponding cam positioned along the processing path. The step of lifting the bird carrier with respect to the trolley support may further include telescoping the bird carrier with respect to said trolley support.

BRIEF DESCRIPTION OF THE SEVERAL VIEWS OF THE DRAWINGS

The invention will now be described with reference to the following drawings where like reference numerals designate corresponding parts throughout the several views.

DETAILED DESCRIPTION OF THE PREFERRED EMBODIMENTS

Figure 1:
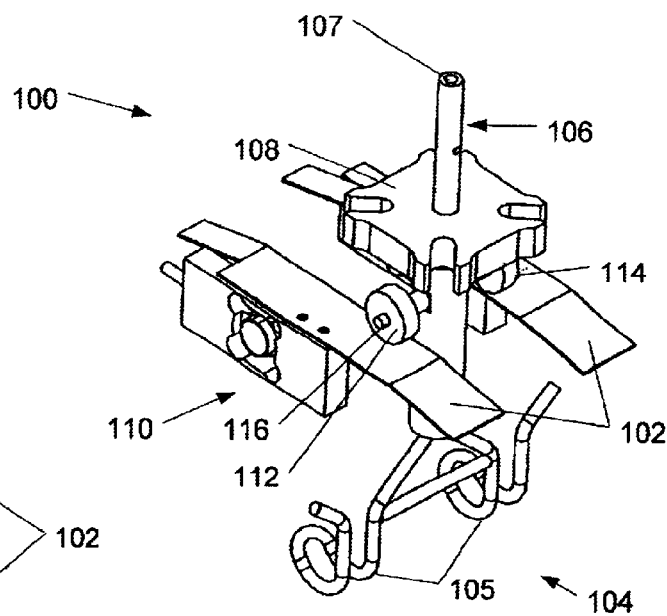
FIG. 1 is an isometric view of a new telescopic poultry shackle assembly on a weighing scale track.
Figure 2:
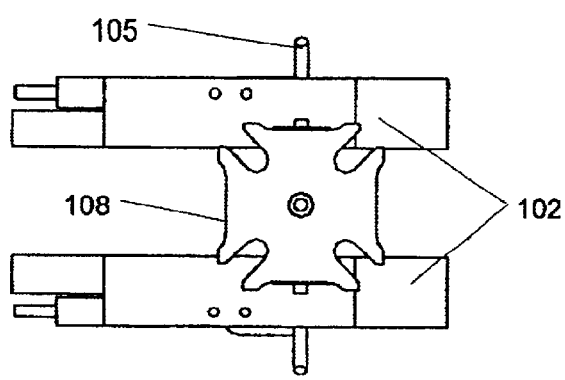
FIG. 2 is a top plan view of the shackle assembly and track shown in FIG. 1.
Figure 3:
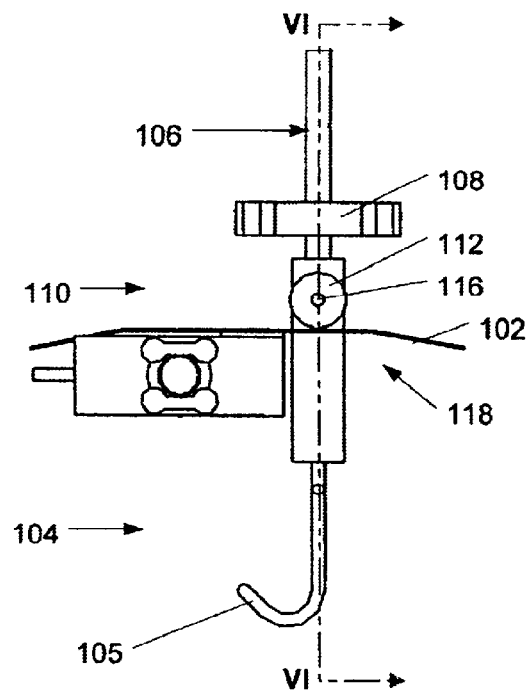
FIG. 3 is a side elevation view of the shackle assembly and track shown in FIG. 1.
Figure 4:
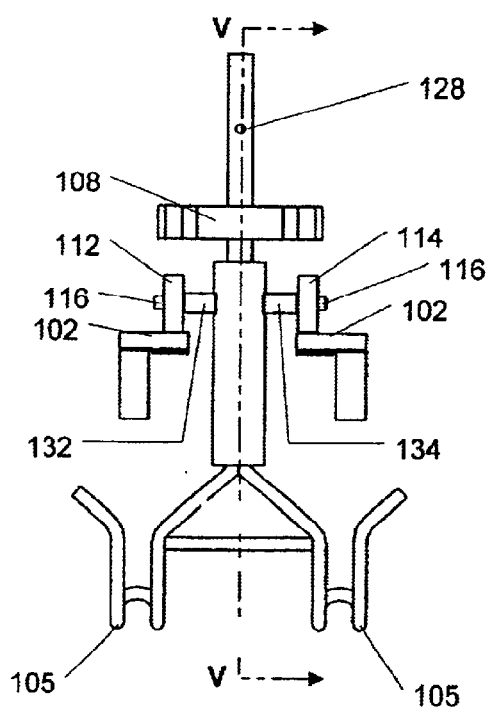
FIG. 4 is a front elevation view of the shackle assembly and track shown in FIG. 1.

FIGS. 1–9 illustrate a first embodiment of a shackle assembly 100 for transporting a poultry carcass (not shown) that is suspended by its legs along a processing path and over a weighing scale track 102 for weighing the carcass. The shackle assembly 100 includes a bird carrier 104 having a pair of stirrups 105 that are open at their upper ends for receiving the legs of a poultry carcass. A trolley support 106 secures the shackle assembly 100 to a trolley assembly (not shown) such as the trolley assembly 14 that is shown in FIG. 1 of U.S. Pat. No. 6,179,202. For example, a bolt (not shown) may be fitted in the internally threaded portion 107 of the trolley support 106 for supporting the shackle assembly 100 from a continuous conveyor chain. However, the trolley support 106 may also be connected to, or modified in order to connect to, a wide variety of other types of conveyor lines.

Figures 10, 11:
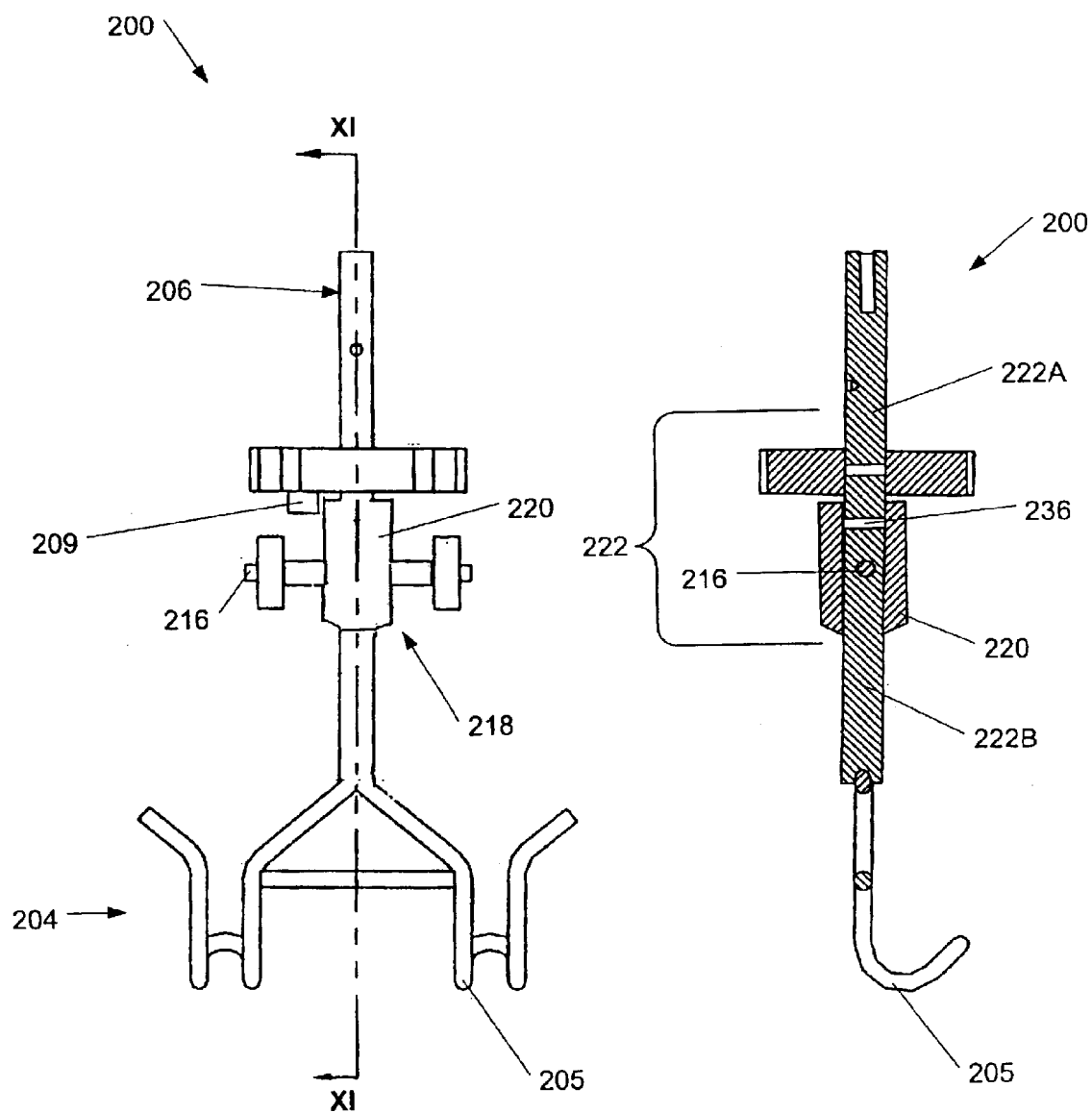
FIG. 10 is a front view of another embodiment of a telescopic poultry shackle assembly.
FIG. 11 is a cross-sectional view of the shackle assembly taken along section line XI—XI in FIG. 10.
Figures 12, 13:
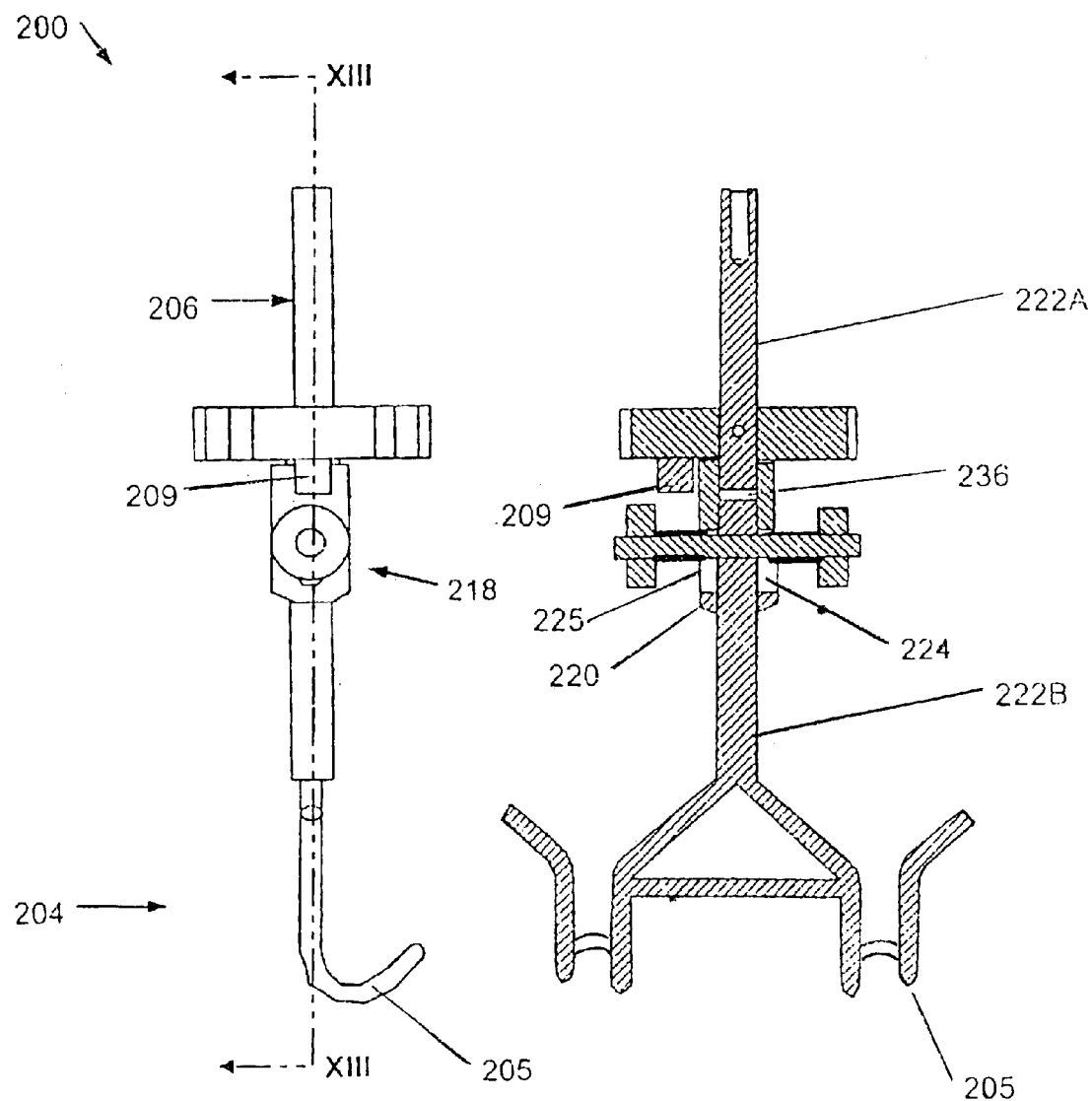
FIG. 12 is a side view of the shackle assembly shown in FIG. 10.
FIG. 13 is a cross-sectional view of the shackle assembly taken along section line XIII—XIII in FIG. 12.

A turning means 108 is mounted to the trolley support 106 for rotating the trolley support and bird carrier 104 in unison. The turning means 108 is preferably a conventional cam-actuated turning gear, also known as a "star wheel." The turning means 108 may further include a downwardly extending protrusion 209 as shown in the second embodiment of the poultry shackle 200 illustrated in FIGS. 10, 12, and 13. The protrusion is preferably in the form of a pin for indicating when the shackle assembly is properly positioned by, for example, breaking a beam of light or otherwise interrupting a magnetic field.

Returning to FIGS. 1–6, a weighing trolley 110 is arranged between the bird carrier 104 and trolley support 106. The trolley 110 includes wheels 112 and 114 mounted on the ends of a wheel axle 116 by any conventional means, such as cotter pins or ball bearings. The wheels 112 and 114 are preferably arranged to roll over the scale track 102. However, the wheels may also simply slide over the scale track 102, or the wheels may be removed so that the wheel axle 116 makes direct contact with the scale track.

Figure 5:
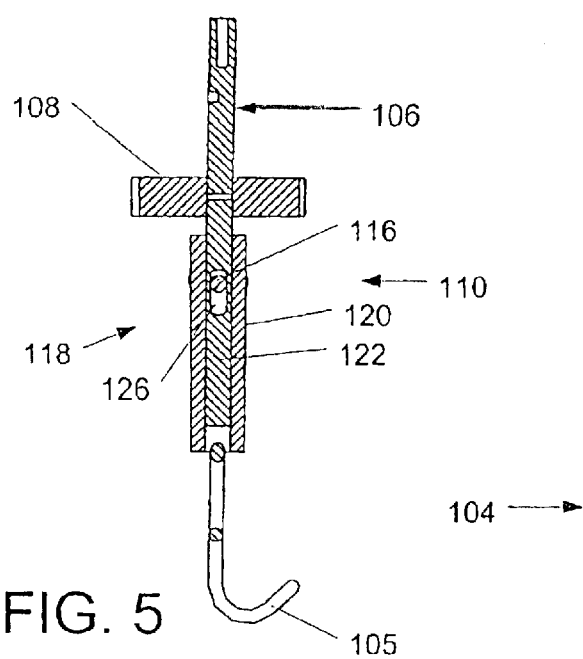
FIG. 5 is a cross-sectional view of the shackle assembly taken along section line V—V in FIG. 4.
Figure 6:
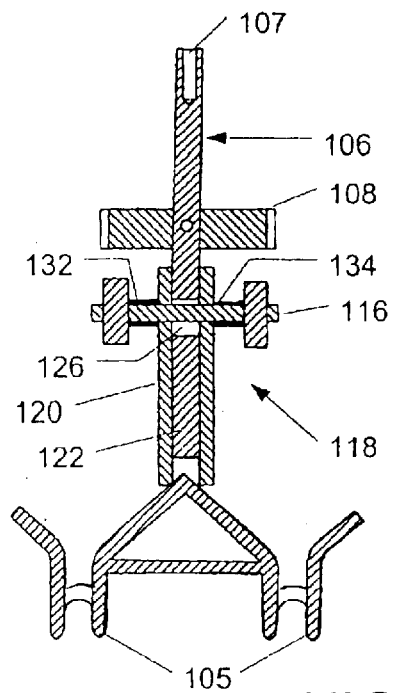
FIG. 6 is a cross-sectional view of the shackle assembly taken along section line VI—VI in FIG. 3.
Figure 8:
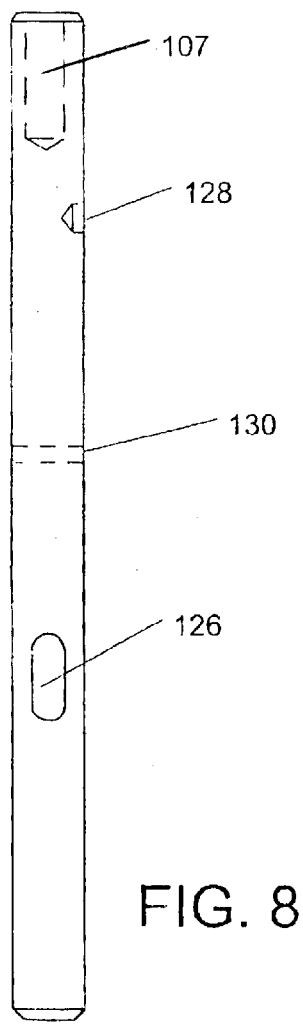
FIG. 8 is a side view of the rod in FIG. 7.
Figure 7:
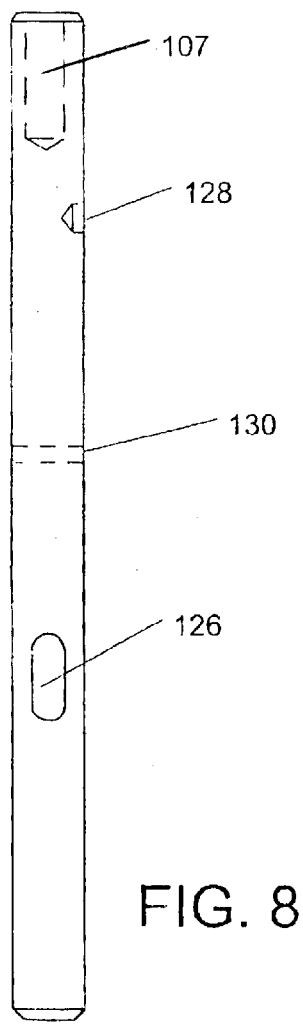
FIG. 7 is a front view of the rod in FIG. 1.
Figure 9:
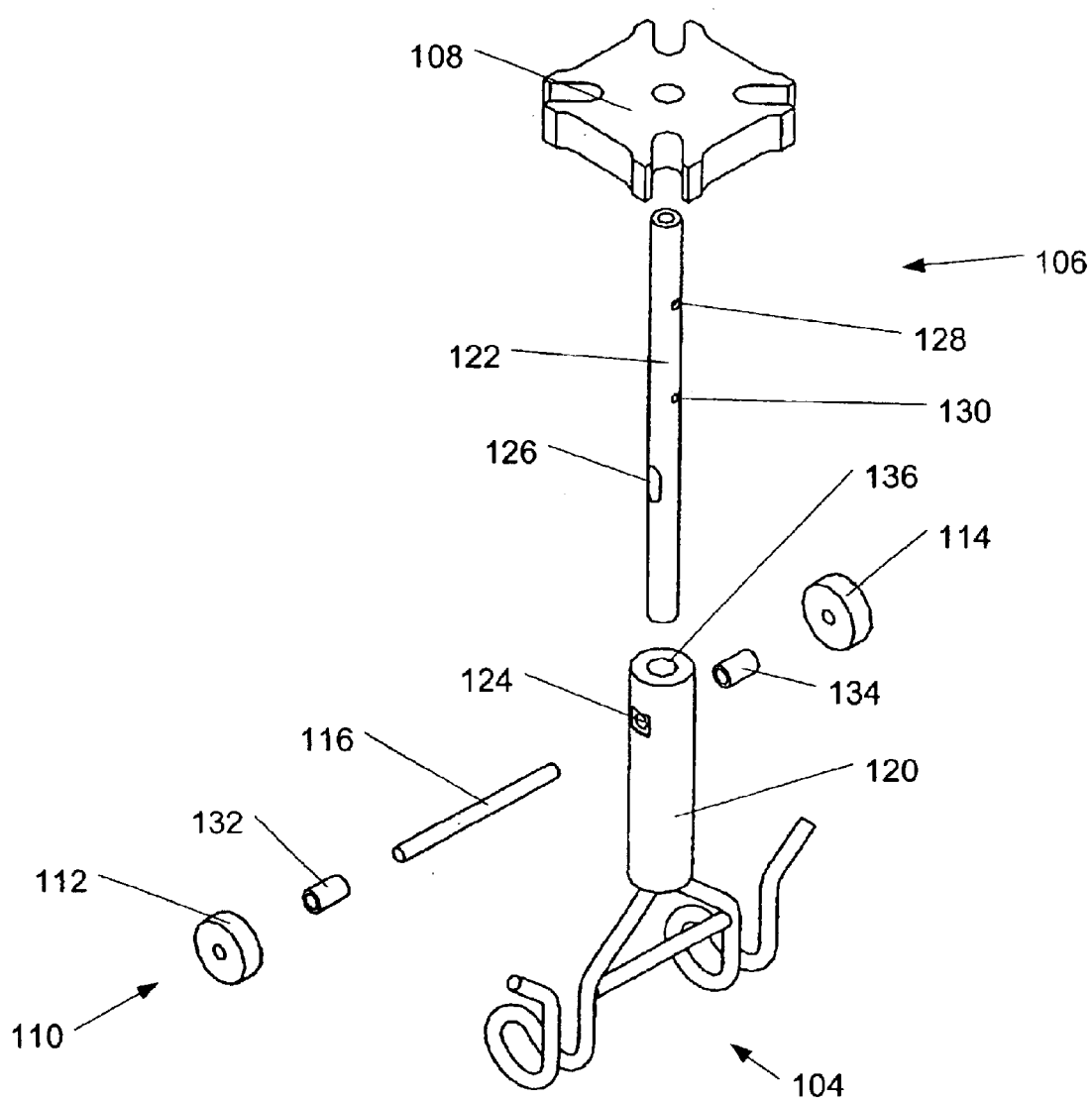
FIG. 9 is an exploded isometric view of the shackle assembly shown in FIG. 1.

As best shown in FIGS. 5, 6, and 9, the bird carrier 104 and trolley support 106 in the shackle assembly 100 are joined by a telescopic connector means 118. The structure of the telescopic connector means 118 preferably includes one of the trolley support 106 and the bird carrier 104 having a tubular support defining a central passage and the other of the trolley support and the bird carrier having a rod extending into said central passage of the tubular support. In the first embodiment of the poultry shackle assembly 100 that is shown in FIGS. 1–9, the structure of the telescopic connector means 118 is arranged with the bird carrier 104 including a tubular support 120 and the trolley support 106 including a support rod 122.

As best shown in FIG. 9, the support rod 122 is arranged inside the tubular support 120 so that the tubular support opening 124 and the rod opening 126 are aligned to receive the wheel axle 116. At least one of these openings has a larger vertical breadth than a cross-sectional breadth of the wheel axle. For example, as best illustrated in FIGS. 6 and 9, the rod opening 126 is elongated into a vertically oriented slot so as to allow the wheel axle 116 to slide along the longitudinal axis of the rod 122. The width of the slotted opening 126 is chosen to allow the wheel axle 116 to slide along the vertical axis of the slot while the length of the slot is chosen so as to provide adequate vertical movement of wheel axle. Additional openings 128 and 130 in the rod 120 are also provided for securing the turning means 108 and/or other structures to the rod 120.

The opening 124 in the tubular support 120 may be a slot having a shorter length than the opening 126 of support rod 122. More particularly, as shown in FIGS. 5–6, the tube opening 124 corresponds to the circular shape of the wheel axle 116 and is slightly larger than the diameter of the wheel axle so as to allow the axle to be slid through both of the openings 124 and 126 during assembly. This arrangement eliminates any significant play between the wheel axle 116 and tube support 120 so that moving the weighing trolley 110 upward along the longitudinal axis of the rod 122 will cause the bird carrier 110 to slide upward against the weight of the bird.

Since the tubular support 120 is connected with the bird carrier 104, lifting the wheel axle 116 over a scale track will cause the weight of the bird carcass, tubular support, and bird carrier to be entirely supported by the axle. Thus, a carcass can be accurately weighed by simply rolling the wheels 112 and 114 over the scale track 102 in either the forward or reverse directions. The arrangement of the openings 124 and 126 also prevents the wheel axle 116 and tubular support 120 from rotating around the longitudinal axis of the rod 122 and keeps the wheels 112 and 114 properly oriented. The tubular support 120 and rod 122 are therefore maintained in a substantially non-rotating relationship that reduces the likelihood of inaccurate measurements caused by an unstable hangar and/or carcass. Furthermore, if the wheel axle 116 is improperly aligned parallel to the weighing scale track, then the wheels 112 and 114 are likely to pass harmlessly between the two tracks without damaging the scale. Moreover, only the tubular support 120 and bird carrier 104 are lifted with the bird, instead of the entire hanger assembly 100. Consequently, less weight compensation is required in order to arrive at the accurate weight measurement for just the carcass.

As best shown in FIG. 6, the wheel axle 116 may also be fitted with sleeves 132 and 134 for preventing the axle from sliding laterally through the tubular support 120. As shown in FIG. 9, the tubular support opening 124 may be countersunk to receive the ends of the sleeves 132 and 134. Alternatively, the opening 124 may be enlarged so that ends of the sleeves 132 and 134 abut the rod 122, rather than the tubular support 120. The rod opening 126 may also be similarly countersunk or enlarged. Lateral sliding of the axle 116 may also be prevented by a variety of other means such as keys, pins, clips, washers, or rings. The wheel axle 116 may also be fixed to the tubular support 120.

Frictional forces between the tubular support 120 and rod 122 can be reduced using suitable anti-friction coatings, such as Teflon™ or other lubricants, on the surface of rod and/or walls of the central passage 136 inside the tubular support. For processing modules in which the bird carrier 104 needs to resist upward movement, a guide or collar may be positioned over the wheel axle 116 in order to prevent upward movement.

A second embodiment of a shackle assembly is shown in FIGS. 10–13. In this second embodiment 200, the support rod 222 is formed in two detached portions 222A and 222B. The upper portion 222A of the rod 222 forms the trolley support 206 while the lower portion 222B of the rod 222 is formed in one piece with the stirrups 205 in order to create the bird carrier 204. In this embodiment, the telescopic connector means 218 for connecting the trolley support 206 to the bird carrier 204 includes the tubular support 220 being secured to the upper rod portion 222A. The lower portion 222B of the rod 222 in bird carrier 204 then slides into the central passage 236 (FIGS. 11 and 13) defined by the tubular support 220. Since the tubular support 220 is now fixed to the trolley support 206, rather than the bird carrier 204, the breadth of the tube opening 224 is now made larger than the breadth of the rod opening 236 in order to provide telescopic movement between the trolley support and the bird carrier. In particular, the tube opening 224 is a slot having a width generally corresponding to the diameter of the wheel axle 16 and a length chosen for an appropriate range of vertical movement.

Since shackle assembly 200 shown in FIGS. 10–13 uses two shorter rod portions 222A and 222B, instead of one longer rod 222, smaller bending stresses are created in each of the rod portions. Also, slight differences in sizes or alignment of the lower rod portion 222B and the central passage 236 in tubular support 220 are less likely to affect the telescopic movement. Furthermore, since the larger (slotted) opening is now arranged in the larger diameter (and therefore more rigid) tubular support 220, less material is required in order to achieve the desired rigidity for the tubular support 220 and the rod 222. Moreover, the increased angular distance between the two openings in either side of the tubular support 220 in the second embodiment 200 provides better resistance to twisting of the wheel axle 216 about the vertical axis of the tubular support.

The shackle assembly 200 is also easier to clean and maintain than the shackle assembly 100 shown in FIGS. 1–9. By arranging the open end of the tube 220 at the bottom, any debris inside the tube can be more easily rinsed through the gap between the tubular support 220 and the lower rod portion 222B. Also, since the opening 224 in the outer tube 220 is larger in the second embodiment, improved access to the lower rod portion 222B is provided for better maintainability.

In practice, the scale tracks 102 are sometimes misaligned vertically. If the aligned openings in the telescopic connector means 118 or 218 through which the axle passes are not larger than the axle, one of the wheels might not contact the scale track. This is likely to result in an inaccurate reading from the scale. Thus, the openings in the telescopic connector means are made in a larger breadth than the breadth of the axle of the wheels, thereby permitting the axle and wheels to tilt. This allows the axle to tilt or "float," thereby distributing an equal weight to each of the tracks of the scale.

The embodiments discussed above provide an improved shackle design for which latching and unlatching mechanisms are not required during weighing. The shackle can go over the scale facing either forward or backward and thus requires less turning in order to position the shackle for weighing. Since the shackle assemblies 100 and 200 are more stable as they go over the scale, and since only a portion of shackle assembly is supported by the scale, more accurate weight measurements can be obtained at high conveyor speeds. In addition, the bird carriers 104 (and 204) will not separate from their respective trolley supports 106 (and 206) during normal use and cleaning without first removing the wheel axles 116 (or 216) from the openings 124 and 126 (or 224 and 225).

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. A shackle assembly for transporting a poultry carcass suspended by its legs along a processing path and over a weighing scale track for weighing the carcass, the shackle assembly comprising:

a trolley support;

a bird carrier for suspending the poultry carcass by its legs;

a trolley mounted to said bird carrier for engaging the weighing scale track;

turning means mounted to said trolley support and operatively connected to said bird carrier for rotating said trolley support, said trolley and said bird carrier in unison for presenting the poultry carcass at different orientations to cutting devices located along the process path; and telescopic connector means including a tubular support and a rod received therein telescopically connecting said trolley support to said bird carrier and suspending said bird carrier from said trolley support;

said telescopic connector means configured for applying a weight to the weighing scale track consisting essentially of the weight of said bird carrier, said trolley, and the carcass, but without the weight of the turning means, in response to said shackle assembly engaging the weighing scale track.

2. The shackle assembly of claim 1, wherein said telescopic connector means includes an elongated slot for receiving said trolley.

3. The shackle assembly of claim 1, wherein said telescopic connector means further includes said tubular support and said rod defining aligned openings; and wherein said trolley includes a wheel axle extending through said aligned openings for engaging said tubular support and said rod; at least one of said aligned openings also being of larger breadth than a cross-sectional breadth of said wheel axle for permitting telescopic movement between said tubular support and said rod in a substantially non-rotating relationship.

4. The shackle assembly of claim 3 wherein said larger-breadth opening is arranged in said tubular support.

5. A shackle assembly for transporting a poultry carcass suspended by its legs along a processing path and over a weighing scale track for weighing the carcass, the shackle assembly comprising:

a trolley support;

a trolley mounted to said trolley support for engaging the weighing scale track;

a bird carrier for suspending the poultry carcass by its legs;

telescopic connector means for telescopically connecting said trolley support to said bird carrier and suspending said bird carrier from said trolley support;

turning means mounted to said trolley support and operatively connected to said bird carrier for rotating said trolley support and said bird carrier in unison, said telescopic connector means including one of said trolley support and said bird carrier having a tubular support rod defining a central passage and the other of said trolley support and said bird carrier having a rod extending into said central passage, said telescopic connector means including said trolley support having a tubular support rod defining a central passage, said bird carrier having a rod extending into said central passage of said tubular support, said telescopic connector means further including said tubular support and said rod defining aligned openings, and wherein said trolley includes a wheel axle extending through said aligned openings for engaging said tubular support and said rod, at least one of said aligned openings also being of larger breadth than a cross-sectional breadth of said wheel axle for permitting telescopic movement between said tubular support and said rod in a substantially non-rotating relationship, said larger-breadth opening being arranged in said tubular support red, and said turning means including a pin for indicating an angular position of the turning means.

6. A shackle assembly for transporting a poultry carcass suspended by its legs along a processing path and over a weighing scale for weighing the carcass, the shackle assembly comprising:

a trolley support;

a bird carrier for suspending a poultry carcass by its legs, said bird carrier supported by said trolley support;

a trolley mounted to said bird carrier for engaging the weighing scale;

turning means, mounted to said trolley support, for rotating said trolley support and said trolley together with said bird carrier, in response to engagement by a cam along the processing path; and connector means telescopically connecting said bird carrier to said trolley support; said connector means configured for applying a weight to the weighing scale consisting essentially of the weight of said bird carrier, said trolley, and the carcass, when said shackle assembly engages the weighing scale.

7. The shackle assembly of claim 6, wherein said connector means comprises said trolley support and said bird carrier having overlapping ends with aligned openings extending therethrough with at least one of said aligned openings formed as an elongated slot, and said trolley having a wheel axle extending through said aligned openings and movable along said slot.

8. The shackle assembly of claim 7, wherein said overlapping ends are adapted to move axially with respect to each other in response to the trolley passing over the weighing scale.

9. The shackle assembly of claim 7, wherein said telescopic connector means includes one of said trolley support and said bird carrier having a tubular support defining a central passage and the other of said trolley support and said bird carrier having a rod extending into said central passage.

10. The shackle assembly of claim 9, wherein a top end of said rod is fixed to said trolley support and a top end of said tubular support slideably receives said rod.

11. The shackle assembly of claim 10 wherein said bird carrier is fixed to a bottom end of said tubular support.

12. The shackle assembly of claim 9 wherein a top end of said tubular support is fixed to said trolley support and a bottom end of said tubular support slideably receives said rod.

13. The shackle assembly of claim 12, wherein said bird carrier is fixed to a bottom end of said rod.

14. The shackle assembly of claim 8, wherein one of said aligned openings is a slotted opening.

15. The shackle assembly of claim 14, wherein said slotted opening is formed in one of said rod and said tubular support.

16. A shackle assembly for transporting a poultry carcass suspended by its legs along a processing path and over a weighing scale for weighing the carcass, the shackle assembly comprising:

a trolley support;

a trolley mounted to said trolley support for engaging the weighing scale;

a bird carrier for suspending a poultry carcass by its legs, said bird carrier supported by said trolley support;

connector means for non-rotatably and telescopically connecting said bird carrier to said trolley support; and turning means mounted to said trolley support for turning said bird carrier in response to engagement by a cam along the processing path, said connector means comprising said trolley support and said bird carrier having overlapping ends with aligned openings extending there through, and said trolley having a wheel axle extending through said aligned openings, said overlapping ends being adapted to move axially with respect to each other in response to the trolley passing over the weighing scale, one of said aligned openings being a slotted opening, said slotted opening being formed in said tubular support, and said turning means includes a pin for indicating an angular position of the turning means.

17. A method of processing poultry carcasses as the carcasses move along a poultry processing path and for weighing the carcasses on a weighing scale as the carcasses are moved along the processing path, the method comprising:

telescopically suspending a trolley, a bird carrier and a bird carcass in the bird carrier from a trolley support;

as the bird moves through the processing path turning the trolley, the bird carrier and the carcasses with a turning means about a vertical axis to present the bird carcass in desired orientations as the bird carcass moves through the processing path;

cutting the carcass into segments as the bird moves through the processing path;

passing the trolley over the weighing scale;

in response to passing the trolley over the weighing scale, telescopically lifting the trolley, the bird carrier and the bird carcass with respect to the trolley support and the turning means; and applying with the trolley a weight to the weighing scale consisting essentially of the weight of the bird carrier, the trolley and the carcass but without the weight of the trolley support and turning means, as the carcass passes over the scale.

18. The method of claim 17 wherein the step of turning the carcasses about a vertical axis comprises:

moving the trolley support along the processing path; and engaging a cam follower mounted on the trolley support with a cam positioned along the processing path.

19. The method of claim 17 wherein the step of telescopically lifting the bird and the bird carrier with respect to the trolley support comprises one of telescoping the bird carrier with respect to said trolley support and of telescoping the trolley support with respect to said bird carrier.

20. A shackle assembly for transporting a poultry carcass suspended by its legs along a processing path including a weighing scale track of a weight scale for weighing the carcass, the shackle assembly comprising:

a vertically disposed upper rod assembly including an upper rod, and a turning means configured for rotating said upper rod;

a vertically disposed lower rod assembly including a lower rod, a stirrup at the bottom end of said lower rod for suspending the poultry carcass by its legs, and a trolley attached to an upper portion of said lower rod, said trolley comprising a wheel axle extending horizontally through said lower rod and at least two wheels mounted on said axle straddling said lower rod, so that said trolley, lower rod and stirrup are rotatable in unison about a vertical axis, and wherein said trolley is configured for engaging said shackle assembly to said weighing scale track and moving said shackle assembly along the processing path; and a telescopic connector that couples said upper rod assembly to said lower rod assembly, said telescopic connector comprising a tubular support longitudinally attached to a lower end of said upper rod, said tubular support defining a central passage configured to slideably receive said lower rod, said tubular support defining a horizontally aligned pair of slotted openings intersecting said central passage configured for receiving said wheel axle, wherein each slotted opening has a width generally sized to the diameter of said wheel axle and a height sized for slideable vertical movement of said wheel axle when said shackle assembly is transported over the weighing scale track, wherein upon slideable vertical movement upward of said wheel axle, the weight measured by the weighing scale consists essentially of the weight of said lower rod assembly together with suspended carcass, but without the weight of the upper rod and turning means.

21. The shackle assembly of claim 20, wherein the processing path includes a treatment station comprising a cut up module, wherein said turning means includes a protrusion for indicating a radial position of said upper rod, wherein said turning means is employed to position the shackle assembly for cutting the carcass, and the shackle assembly holds the carcass substantially stationary thereon to allow cutting of the carcass.

22. A shackle assembly for transporting a poultry carcass suspended by its legs along a processing path including a weighing scale track of a weight scale for weighing the carcass, the shackle assembly comprising:

a vertically disposed upper rod assembly including an upper rod, and a turning means configured for rotating said upper rod;

a vertically disposed tubular support assembly including a stirrup at the bottom end of said tubular support for suspending the poultry carcass by its legs, and a trolley attached to an upper portion of said tubular support, said trolley comprising a wheel axle extending horizontally through said tubular support and at least two wheels mounted on said wheel axle straddling said tubular support, said trolley being configured for supporting said shackle assembly on said weighing scale track, and a telescopic connector comprising said tubular support defining a central passage configured to slideably receive said upper rod, said upper rod includes a horizontally aligned pair of slotted openings intersecting said central passageway configured for receiving said wheel axle, wherein each slotted opening has a width generally sized to the diameter of said wheel axle and a height sized for slideable vertical movement of said wheel axle when said shackle assembly is transported over the weighing scale track, such that when the trolley is lifted by the weight scale and upon slideable vertical movement upward of said wheel axle, the weight applied by the trolley to the weighing scale consists essentially of the weight of said tubular support assembly and the trolley together with suspended carcass but without the weight of the upper rod assembly.

23. The shackle assembly of claim 22, and further including: a position indicating means rotatable with said turning means for indicating a radial position of said upper rod.

* * * * *